US006666898B2

(12) United States Patent
Yu Chen

(10) Patent No.: US 6,666,898 B2
(45) Date of Patent: Dec. 23, 2003

(54) ADHESIVE-TAPE CUTTING DEVICE OF AN ADHESIVE-TAPE HOLDER

(76) Inventor: Hsiu-Man Yu Chen, No. 27, Sec. 1, Dafu Rd., Tantz Shiang, Taichung (TW), 427

( * ) Notice: Subject to any disclaimer, the term of this patent is extended or adjusted under 35 U.S.C. 154(b) by 39 days.

(21) Appl. No.: 10/058,505

(22) Filed: Jan. 30, 2002

(65) Prior Publication Data

US 2003/0141336 A1 Jul. 31, 2003

(51) Int. Cl.[7] .............................. B26D 7/00; B26F 3/00; B65H 35/00; B23B 31/00

(52) U.S. Cl. ............................... 8/649; 225/19; 225/66; 225/89; 156/523; 156/579; 156/574; 156/577

(58) Field of Search .............................. 83/649; 225/89, 225/56, 65, 66, 25, 20, 77, 19; 156/523, 527, 579, 574, 576, 577, 526; 7/158; 206/225, 228, 229; 242/422.5, 588

(56) References Cited

U.S. PATENT DOCUMENTS 5,236,540 A * 8/1993 Shi ............................ 156/523
5,393,367 A * 2/1995 Yu Chen ..................... 156/523
5,456,790 A * 10/1995 Yu Chen ..................... 156/527
5,849,144 A * 12/1998 Tang et al. .................. 156/577
6,159,328 A * 12/2000 Gaikoski et al. ............ 156/269
6,478,067 B1 * 11/2002 Huang ........................ 156/511

* cited by examiner

*Primary Examiner*—Boyer D. Ashley
(74) *Attorney, Agent, or Firm*—Troxell Law Office PLLC

(57) ABSTRACT

An adhesive-tape cutting device of an adhesive-tape holder includes a side plate provided on one side of a blade holder of the adhesive-tape holder. The side plate is provided with a support rod and a pivotal shaft. A press plate is formed with a push plate at its lower end to push a slide base together with a blade to move forward, with a curved support member formed between the press plate and the push plate and rested against the support rod of the side plate. The curved support member rests against the support rod serving as a fulcrum, operating the press plate with a little force to let the blade cut off an adhesive tape easily. The press plate is sandwiched between the support rod and the slide base, so it is needless to be additionally provided with any fixing member, economizing cost and facilitating assembling.

1 Claim, 4 Drawing Sheets

ADHESIVE-TAPE CUTTING DEVICE OF AN ADHESIVE-TAPE HOLDER

BACKGROUND OF THE INVENTION

This invention relates to an adhesive-tape cutting device of an adhesive-tape holder, particularly to one capable to cut off an adhesive tape with a little force, economize cost and facilitate assembling.

A conventional adhesive-tape holder, as disclosed in the Taiwan Patent No. 5641377, 5906705, 5849144, titled "RETRACTABLE BLADE HAND HELD TAPE APPLICATORS", has its flat plate and its blade connected by a spring and then pressed by a press plate having a positioning member serving as a fulcrum to push the blade forward to cut off an adhesive tape.

However, such a conventional adhesive-tape holder has the following defects.

1. The spring is dangled between the flat plate and the blade, so it is likely to be contracted to an unexpected position and hard to recover its position as anticipated.
2. A fixing plate is needed to be provided on the rear side of the press plate, and positioning members have to be respectively provided on opposite sides of the fixing plate to be respectively inserted in the positioning grooves of an adhesive-tape holder and of a side plate, thus, complicating its structure and increasing its cost.

SUMMARY OF THE INVENTION

The objective of the invention is to offer an adhesive-tape cutting device of an adhesive-tape holder, in which a blade is guided and restricted to move forward by a blade slide base and a blade holder, and a press plate is sandwiched between the support rod of a side plate and the blade slide base and pressed to produce a reaction to activate the blade to cut off an adhesive tape easily, needless to be additionally provided with any positioning member for keeping the press plate in place, economizing its cost and facilitating assembling.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
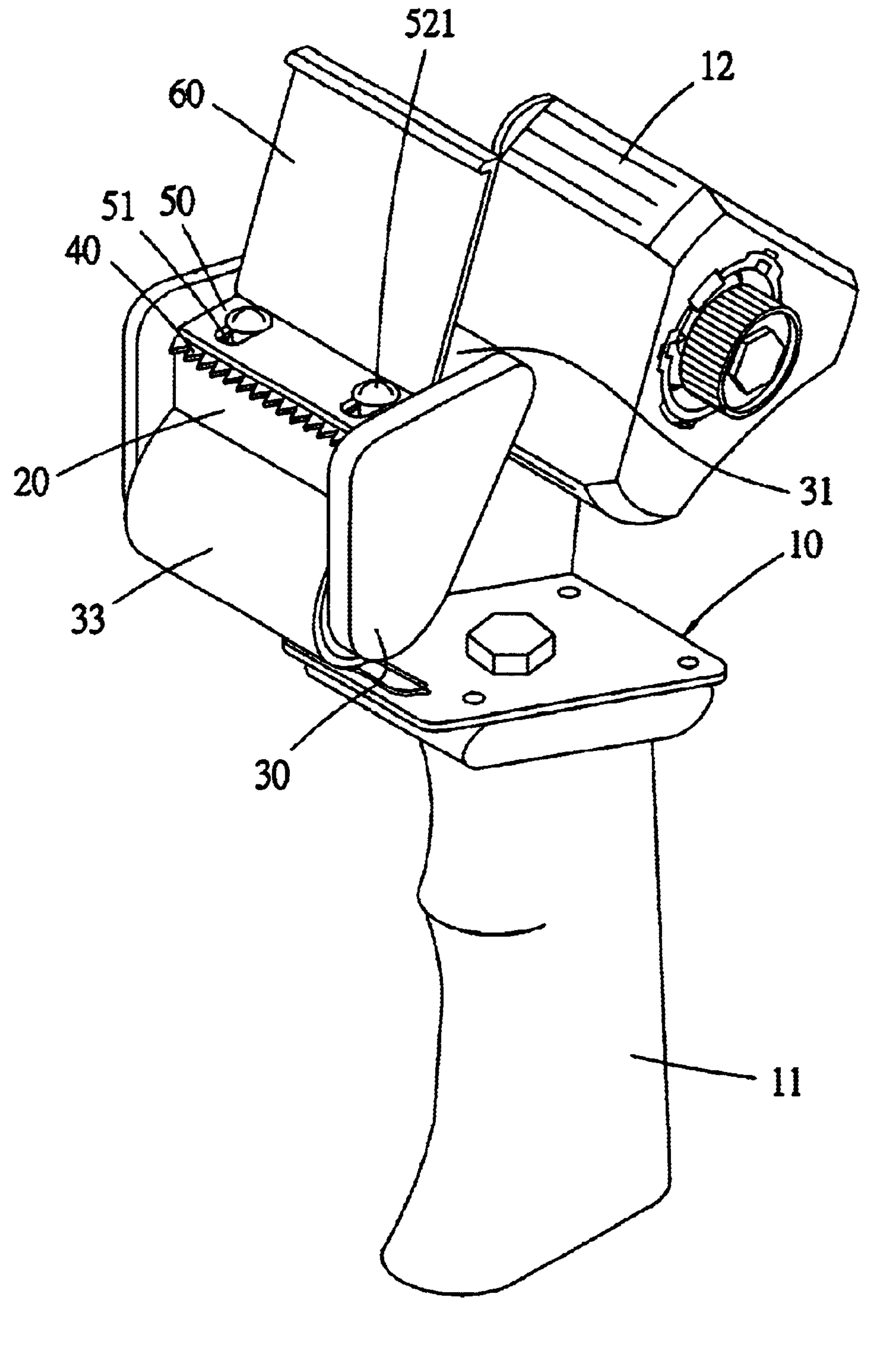
FIG. 1 is a perspective view of an adhesive-tape cutting device of an adhesive-tape holder in the present invention.
Figure 2:
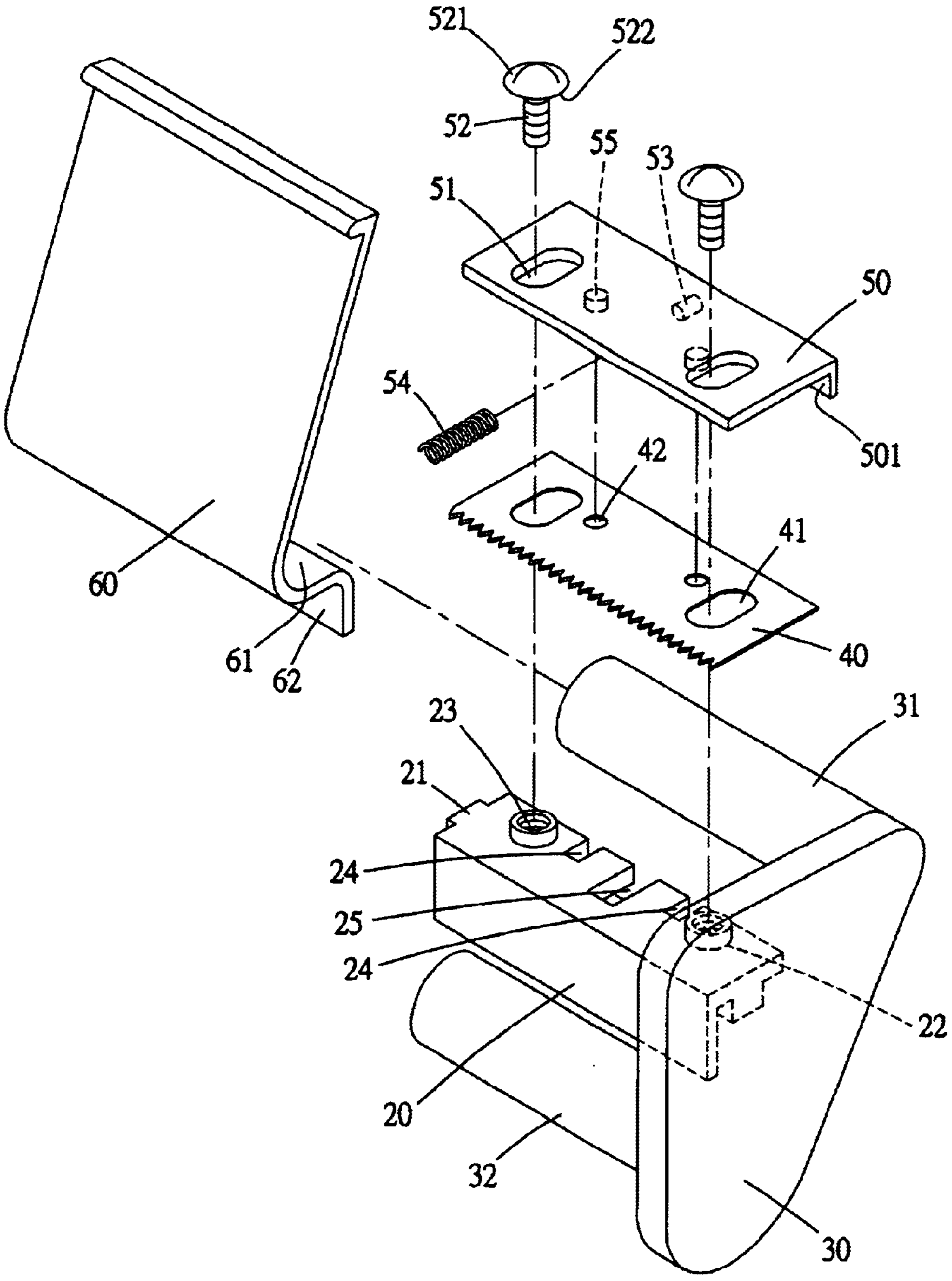
FIG. 2 is an exploded perspective view of the adhesive-tape cutting device in the present invention.

A preferred embodiment of an adhesive-tape cutting device of an adhesive-tape holder in the present invention, as shown in FIGS. 1 and 2, includes an adhesive-tape holder 10, a blade holder 20, two side plates 30, a blade 40, a slide base 50 and a press plate 60 as main components combined together.

The adhesive-tape holder 10 has a handle 11 formed under and an adhesive-tape base 12 fixed on a side edge.

The blade holder 20 has a fixing member 21 formed on one end to be engaged with one end of the adhesive-tape holder 10 (not shown). The blade holder 20 is provided with two fixing studs 22 with a threaded hole 23 respectively, a receiving groove 25 on the center and two slide grooves 24 respectively on the left and the right of the receiving groove 25.

The two side plates 30 respectively have a column-shaped support rod 31 and a pivotal shaft 32 provided at a proper position above and below the blade holder 20 to be combined together with the adhesive-tape holder 10, with the pivotal shaft 32 fitted around with a roller 33. The side plate 30 and the blade holder 20 are formed integral or combined together by screwing or inserting.

The blade 40 is fitted on the blade holder 20 and has two oval slide holes 41 corresponding to two fixing stubs 22 of the blade holder 20 for receiving these two fixing studs 22 and moving therein, and further has two fixing holes 42 conforming to two slide grooves 24 of the blade holder 20.

The slide base 50 is mounted on the blade 40 to activate the blade 40 to shift. The slide base 50 is provided with two oval slide holes 51 on opposite ends to correspond to two slide holes 41 of the blade 40. Then, two bolts 52 are respectively screwed through the slide holes 51, 41 and fixed with the threaded holes 23 of the blade holder 20, but the bottom side of the head 521 of the bolt 52 doesn't tightly touch the top surface of the slide base 50 so as to permit the blade 40 and the slide base 50 to slide and shift therein. Besides, the slide base 50 is L-shaped and formed with a vertical short side 501 provided with a projecting stud 53 on the inner side and a spring 54 having its one end fitted around the projecting stud 53 and its other end inserted in the receiving groove 25 of the blade holder 20. Further, the slide base 50 is provided at the bottom side with two positioning studs 55 protruding downward and respectively inserted through the positioning holes 42 of the blade 40 and then getting in the slide grooves 24 of the blade holder 20.

The press plate 60 is formed with a vertical push plate 62 at the lower end to push against the vertical short side 501 of the slide base 50. A curved support member 61 is formed between the press plate 60 and the vertical push plate 62 to closely rest on the support rod 31 of the side plate 30.

Figure 3:
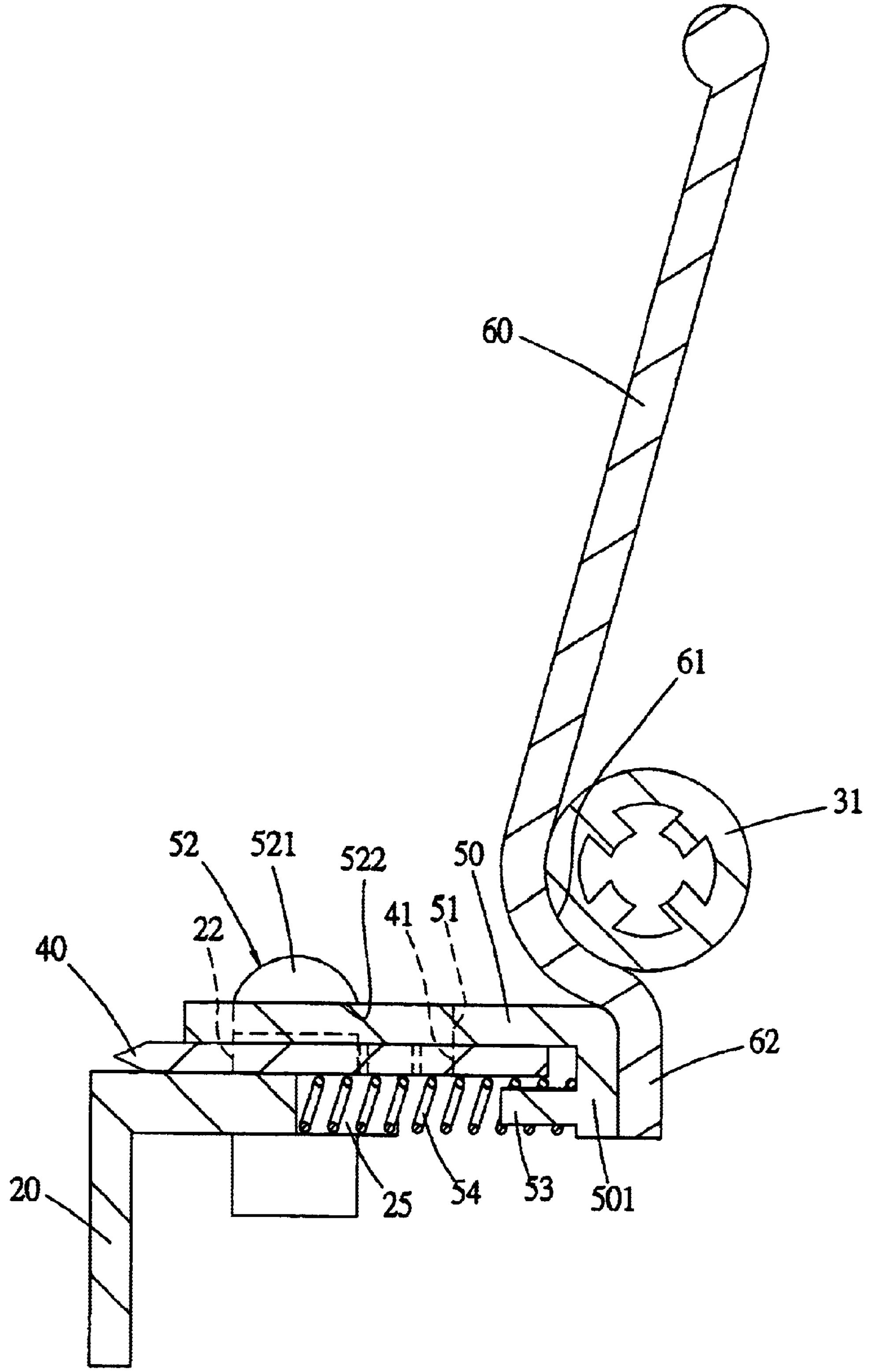
FIG. 3 is a side cross-sectional view of the adhesive-tape cutting device assembled in the present invention.

In assembling, as shown in FIGS. 2 and 3, firstly, the blade 40 and the slide base 50 are orderly positioned on the blade holder 20 to let the slide holes 41, 51 of the blade 40 and the slide base 50 fit around the fixing studs 22 of the blade holder 20 and then fixed together by means of the bolts 52. The bolts 52 are merely screwed for keeping the blade 40 and the slide base 50 in place, but let their bottom sides not touch against the top surface of the slide base in order to let the slide holes 41 and 51 capable to slide along the fixing studs 22, and thus the slide base 50 and the blade 40 can only shift back and forth.

Meanwhile, the positioning studs 55 of the slide base 50 are inserted through the positioning holes 42 of the blade 40 and then in the slide grooves 24 of the blade holder 20 so as to let the slide base 50 activate the blade 40 to move. In addition, the spring 54 has its two ends respectively push against the projecting stud 53 and the receiving groove 25 so that the slide base 50 can be forced to recover with quickness by the resilient force of the spring 54.

Next, the press plate 60 has its curved support member 61 inserted sideward in between the slide base 50 and the support rod 31 of the side plate 30, letting the support member 61 rest closely on the support rod 31 and the push plate 62 push against the vertical short plate 501 of the slide base 50.

Lastly, the blade holder 20 has its fixing member 21 stably combined with the adhesive-tape holder 10, and synchronously the side plate 30 together with the blade holder 20 is secured on the adhesive-tape holder 10 by screws (not shown) to fin is h assembling an adhesive-tape cutting device.

Figure 4:
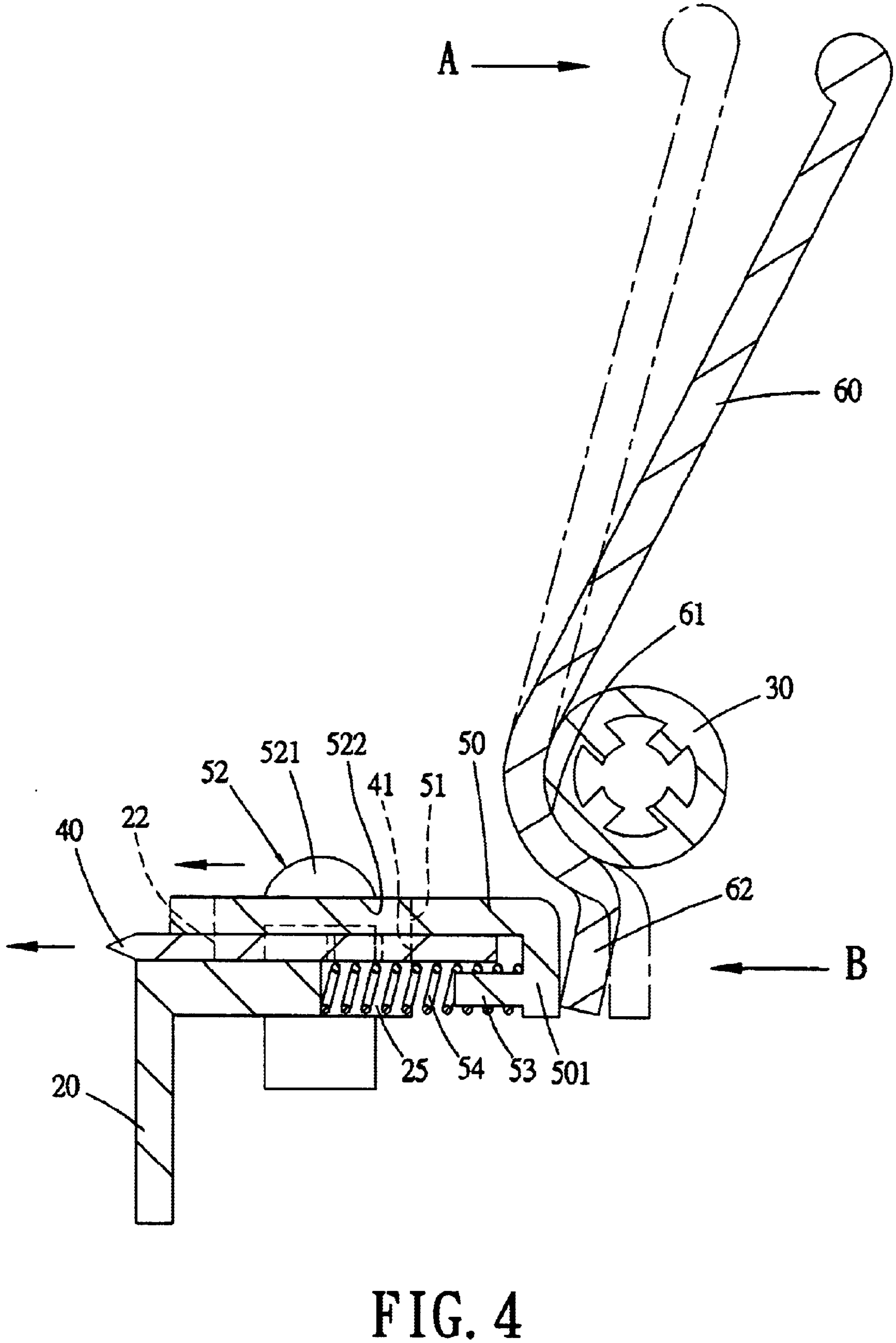
FIG. 4 is a side cross-sectional view of the adhesive-tape cutting device in an operating condition in the present invention.

In using, as shown in FIGS. 3 and 4, the adhesive tape on the adhesive-tape base 12 is pulled out to pass through the roller 33 and get onto the press plate 60. Subsequently, the adhesive tape is glued on the article to be adhered and then rotate the roller 33 to let the adhesive tape pulled out smoothly, and at the same time the adhesive tape can be pressed flat and smooth by the end edge of the press plate 60. In case of cutting off the adhesive tape, just forcefully press the handle 11 on the article to be adhered and the top end of the press plate 60 will produce an action A. Synchronously the push plate 62 of the press plate 60 will give rise to a reaction B because the support rod 31 of the side plate 30 supporting the support member 61 serves as a fulcrum. As the reaction B is larger than the resilient force of the spring 54, the push plate 62 is forced to push the slide base 50 together with the blade 40 to move forward to cut off the adhesive tape.

On the contrary, in case of releasing the pressure of the handle, the slide base 50 together with the blade 40 will quickly recover by the resilient force of the spring 54, ensuring safety in using.

As can be noted from the above description, this invention has the following advantages.

1. The bottom side 522 of the head 521 of the bolt 52 doesn't closely touch the top surface of the slide base 50, enabling the slide base 50 and the blade 40 move back and forth. Besides, the blade 40 is sandwiched between the blade holder 20 and the slide base 50 to be guided and restricted to move back and forth smoothly and cut off the adhesive tape precisely.
2. The press plate 60 has its support member 61 sandwiched by the support rod 31 and the slide base 50 and kept in place therebetween, needless to be additionally provided with a fixing plate and a fixing member for securing a press plate as described in the conventional device, economizing its cost and facilitating assembling.
3. The press plate 60 has its curved support member 61 rested closely against the support rod 31 serving as a fulcrum to bring forth an action (A) and a reaction (B) by interaction, easy to cut off an adhesive tape with a little force.

While the preferred embodiment of the invention has been described above, it will be recognized and understood that various modifications may be made therein and the appended claims are intended to cover all such modifications that may fall within the spirit and scope of the invention.

I claim:

1. An adhesive-tape cutting device of an adhesive-tape holder comprising:

a) the adhesive-tape holder having a handle and an adhesive-tape base;

b) a blade holder connected to the adhesive tape holder, the blade holder having:

i) two fixing studs;

ii) a center receiving groove; and iii) two slide grooves, one slide groove on either side of the receiving groove;

c) two side plates with a column-shaped support rod and a pivot shaft with a roller positioned therebetween, the two side plates being connected to the blade holder;

d) a blade having two first oval slide holes and two positioning holes;

e) a slide base slidably connected to the blade holder, the slide base having:

i) two positioning studs inserted through the positioning holes of the blade and into the two slide grooves in the blade holder;

ii) two second oval slide holes, the fixing studs of the blade holder being inserted into the first and second oval slide holes of the blade and the slide base;

iii) a spring positioned between the center receiving groove in the blade holder and the slide base; and iv) a projecting stud inserted through the spring, wherein the slide base and blade are slidable between a retracted position and a cutting position; and f) a press plate having a press plate end, a vertical push plate formed on an end opposite the press plate end and a curved support member formed between the press plate end and the vertical push plate, the curved support member pivotally engaging the support rod, the vertical push plate engaging the slide base, such that when a force is applied to the press plate end, the vertical push plate compresses the spring and slides the slide base and blade into the cutting position, and when the force is removed from the press plate end, the spring slides the slide base and blade into the retracted position.

* * * * *